Oct. 12, 1954

H. W. KNOPLOH 2,691,453

MANURE LOADER

Filed Dec. 1, 1952

Henry W. Knoploh
INVENTOR.

Oct. 12, 1954 — H. W. KNOPLOH — 2,691,453
MANURE LOADER

Filed Dec. 1, 1952 — 3 Sheets-Sheet 3

Henry W. Knoploh
INVENTOR.

Patented Oct. 12, 1954

2,691,453

UNITED STATES PATENT OFFICE 2,691,453

MANURE LOADER

Henry W. Knoploh, Sumner, Iowa

Application December 1, 1952, Serial No. 323,430

2 Claims. (Cl. 214—140)

This invention relates to agriculture equipment and more particularly to an attachment for a tractor adapted to be used as a manure loader.

An object of this invention is to provide an attachment which may be easily secured to a tractor so as to enable the tractor and the attachment to be employed in loading, carrying and depositing manure or any other bulk cargo with which it is desired to use the apparatus.

The construction of this invention features a frame which is pivotally attached to the tractor. The scoop for engaging and carrying the manure or other bulk cargo is attached to the frame. Means are provided for raising and lowering the scoop and for permitting the discharge plate of the scoop to rotate to permit discharge of the contents. The means for raising and lowering the scoop includes a novel differential drive mechanism which is adapted to be attached to the power takeoff of the tractor.

The attachment is supported by a pair of spaced wheels mounted on an axle which supports the other elements of the attachment. Further, the wheels are so connected to the tractor as to cause rotation of the wheels when the tractor is turned.

Still further objects and features of the invention reside in the provision of an attachment for a tractor which is adapted for use as a manure loader that is strong, durable, highly efficient in operation, simple in construction and manufacture, and capable of being readily produced for sale at a relatively low cost.

These together with the various ancillary objects of the invention which will become apparent as the following description proceeds, are attained by this manure loader, a preferred embodiment of which has been illustrated in the accompanying drawings, by way of example only, wherein.

Figure 1:
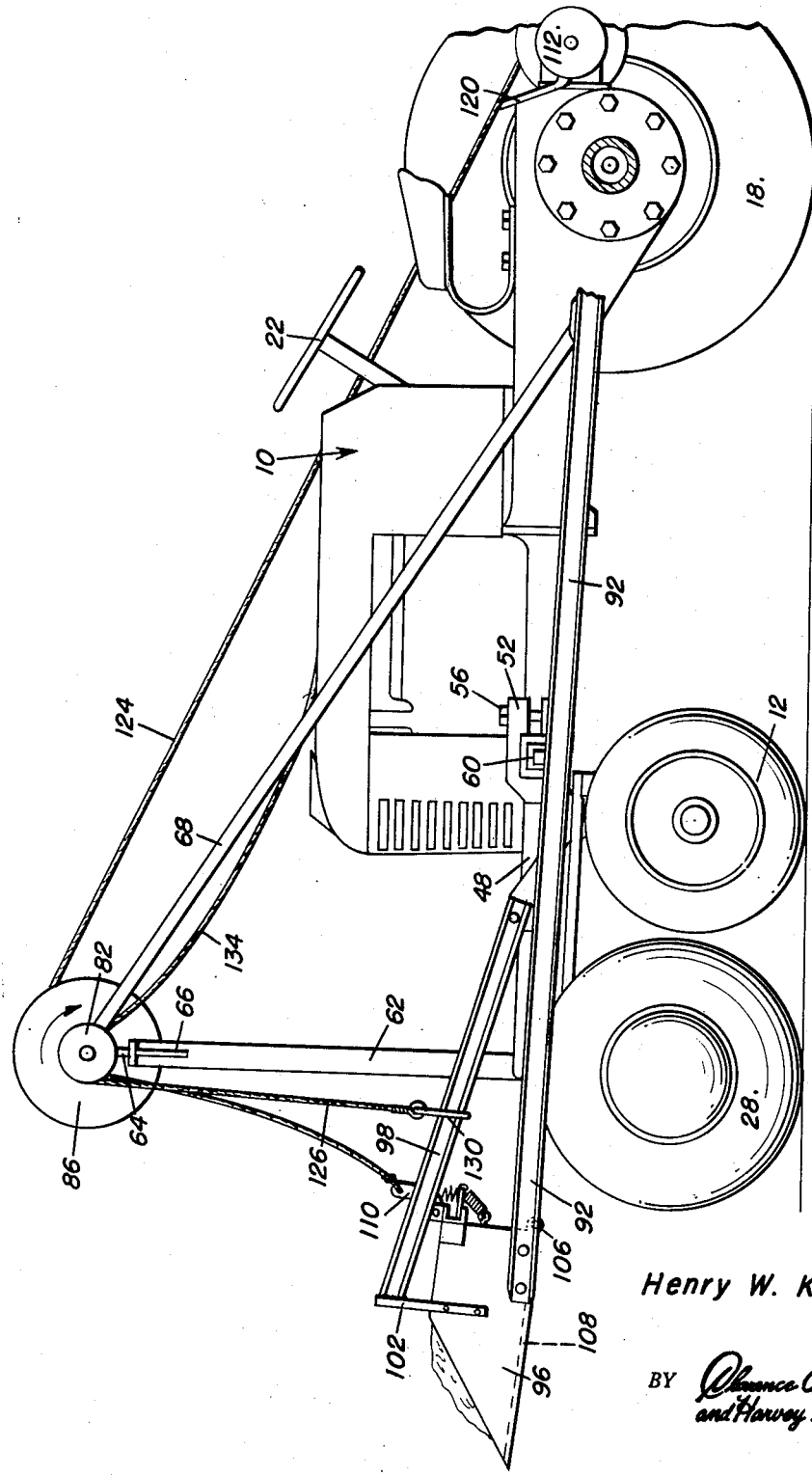
Figure 1 is a side elevational view of the manure loader, comprising the present invention, as shown operatively installed on a tractor.
Figure 2:
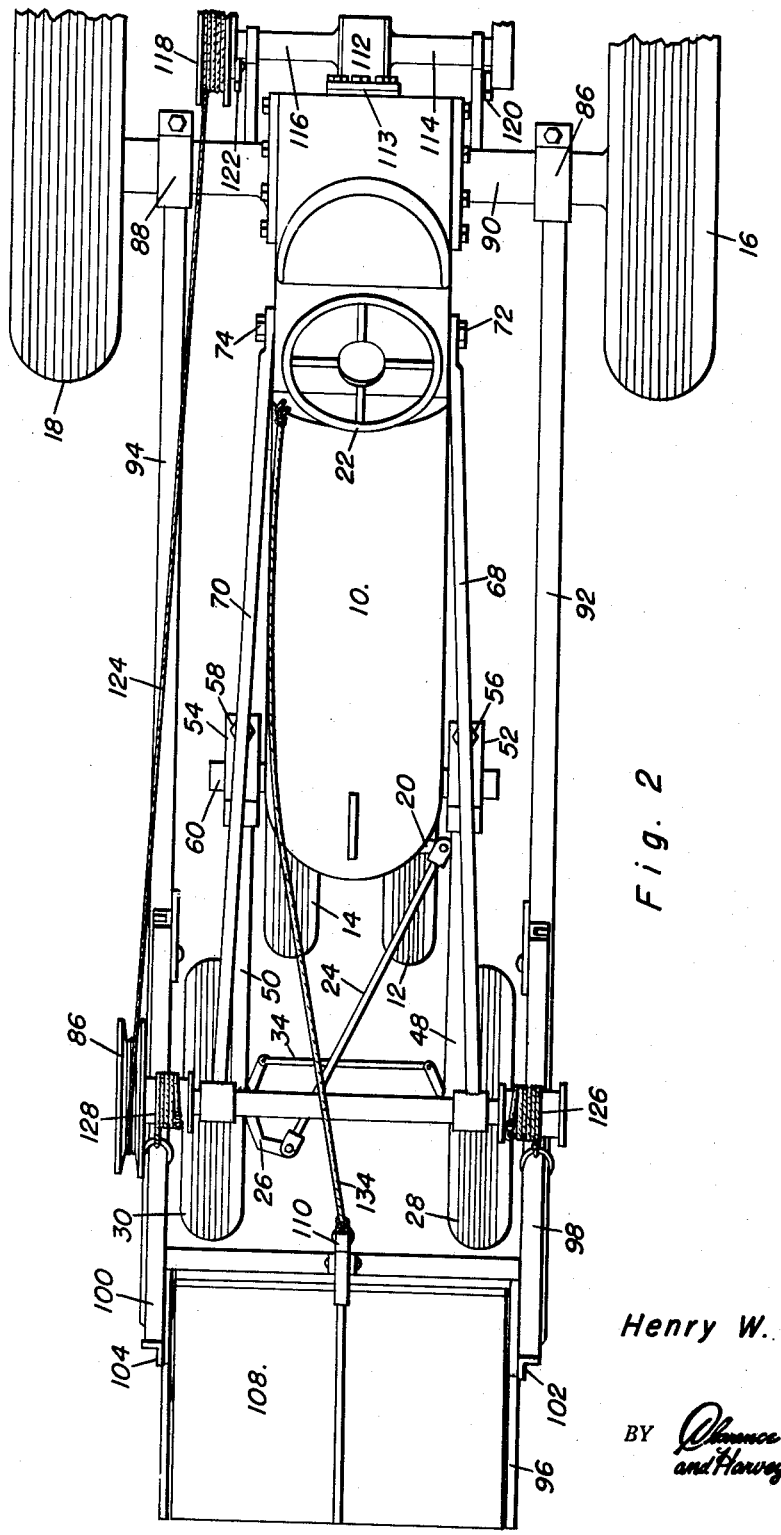
Figure 2 is a top plan view of the invention, showing in particular the means for raising and lowering the scoop.
Figure 3:
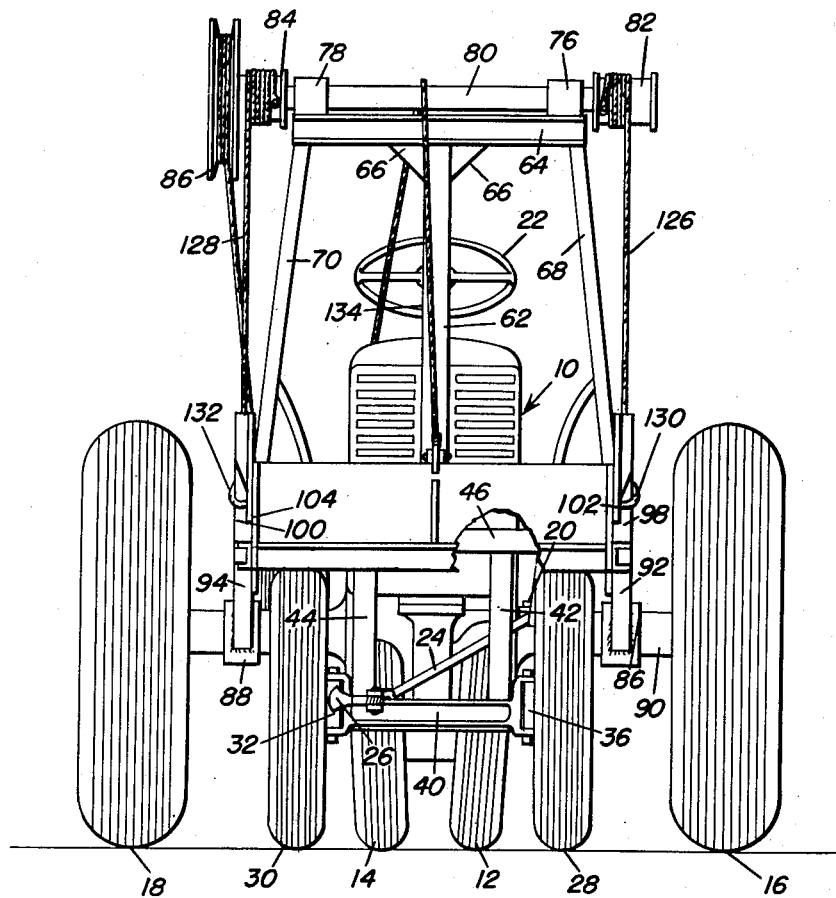
Figure 3 is a front end view of the attachment shown operatively installed in association with a tractor; and, Figure 4 is a side elevation detail showing the scoop in a raised position with the discharge plate rotated so as to permit the contents of the scoop to be readily discharged.

With continuing reference to the accompanying drawings wherein like reference numerals designate similar parts throughout the various views, reference numeral 10 generally designates a tractor of conventional type which is provided with a pair of drive wheels 16 and 18 and a pair of forward steering wheels 12 and 14. The tractor also includes a steering member 20 which is rotated when the wheels 12 and 14 are turned through the mechanism actuated by the steering wheel 22. Connected to the bar 20 is a connecting rod 24 which is also connected to a crank arm 26 turning the wheels 28 and 30 when the steering wheel 22 is turned. The crank arm 26 is connected to a stub shaft 32 on which reel 30 is mounted. By means of connecting links 34, the stub shaft 36 is actuated. The wheel 28 is mounted on the stub shaft 36. The stub shafts 32 and 36 are each rotatably supported by axle 40 which supports a pair of vertically extending frame members 42 and 44. The vertical supporting members 42 and 44 are welded or otherwise secured to and support a central connecting portion 46 to which there is attached or integrally formed spaced rearwardly extending legs 48 and 50. At the ends of the legs 48 and 50 are clamps 52 and 54 which are adapted to be secured by bolt fasteners 56 and 58 in clamping engagement about the hitch bar 60 of the tractor 10.

Extending upwardly from the central connecting portion 46 is a vertical standard 62. Extending substantially perpendicular to the standard 62 is a transverse beam 64 which is suitably reinforced by triangular webs 66. Elongated tubular bars 68 and 70 are terminally connected to the beam 64 by welding and to the tractor 10 by suitable bolt fasteners 72 and 74. Carried by the beam 64 are bearing blocks 76 and 78 in which an operating shaft 80 is journalled. Mounted on the operating shaft 80 are pulley wheels 82 and 84, and a third pulley wheel 86.

Bearing blocks 86 and 88 are mounted on the rear axle 90 of the tractor 10 and spaced substantially parallel frame members 92 and 94 are rigidly connected to the bearing blocks 86 and 88 respectively, the bearing blocks 86 and 88 thus providing a pivotal connection for the frame members 92 and 94. Attached to and extending between the frame members 92 and 94 is a scoop 96 of suitable and desired design.

Annularly upwardly extending bars 98 and 100 are attached to the frame members 92 and 94 medially the ends thereof and are attached to angle studs 102 and 104 which are riveted or welded to the sides of the scoop 96. The bottom and back portions of the scoop 96 are pivotally mounted on a shaft 106 extending between the frame members 92 and 94. This forms a substantially L-shaped discharge plate 108 which is adapted to be held in its closed position by means of a cam trigger arrangement 110.

A differential drive mechanism 112 is connected to the power takeoff 113 of the tractor. The differential drive mechanism 112 drives shafts 114 and 116. On the shaft 116 there is mounted a fourth pulley wheel 118. Brakes 120 and 122 are provided for selectively stopping either of the shafts 114 or 116 and they are both manually released at the same time. A cable 124 is wound on the pulley wheels 118 and 86 and is adapted to drive the pulley wheel 86 and hence the operating shaft 80 and the pulley wheels 82 and 84. By means of cables 126 and 128, which are wound about pulley wheels 82 and 84 respectively and which are connected at their ends to eye members 130 and 132 secured about the bars 98 and 100 the rotary motion of the shaft 80 may be used to lift the bars 98 and 100 and hence the scoop 96. By means of a cable 134, the catch fastener 110 may be actuated in order that the contents of the scoop 96 may be readily discharged.

Figure 4:
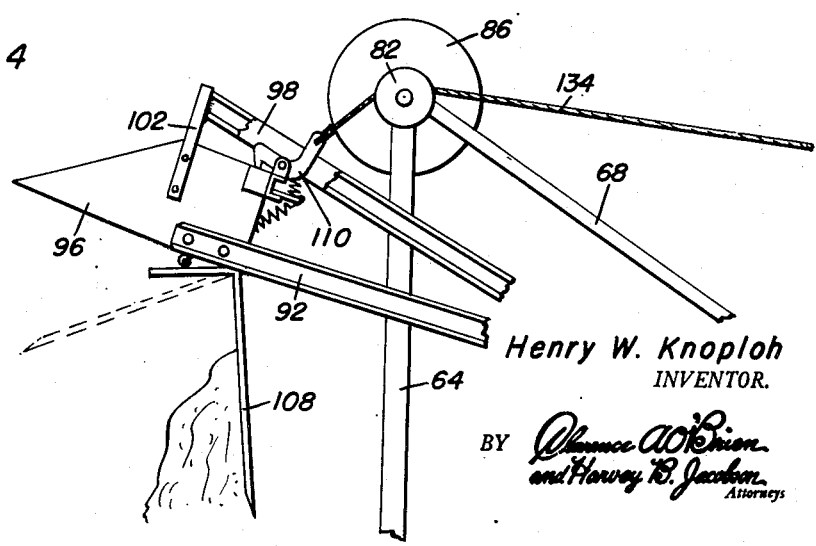

The operation of this manure loader is very simple. Upon actuation of the power takeoff 113, and with brake 120 applied, the shaft 116 will be driven and hence the pulley wheel 118 will drive to rotate the pulley wheel 86 to drive the shaft 80 and hence the pulley wheels 82 and 84 to elevate the scoop 96. Then, the brake 120 may be released and the brake 122 immediately applied to maintain the scoop at a desired elevation. When arriving at the place where it is desired to discharge the load in the scoop 96, it is merely necessary to pull on the cable 134 so as to trip the catch 110 and permit the discharge plate 108 to rotate downwardly as is shown in Figure 4. Then, if it is desired, both brakes 120 and 122 may be released which will permit gravity to lower the scoop and hence the side frame members 92 and 94 and return cable to the pulley 86.

Since from the foregoing, the construction and advantages of this manure loader are readily apparent, further description is believed to be unnecessary.

However, since numerous modifications will readily occur to those skilled in the art after a consideration of the foregoing specification and accompanying drawings, it is not intended to limit the invention to the precise embodiment shown and described, but all suitable modifications and equivalents may be readily resorted to that fall within the scope of the appended claims.

What is claimed as new is as follows:

1. A manure loader for attachment to a tractor comprising a frame adapted to be pivotally attached to a tractor, a scoop on said frame, a substantially U-shaped supporting member adapted to be secured to a tractor including a pair of rearwardly extending legs interconnected by a central connecting portion, a vertical standard secured to and extending upwardly from said central connecting portion, a transverse beam carried by said standard, bearing blocks on said transverse beam, an operating shaft journalled in said bearing blocks, a pair of pulley wheels carried by said shaft operatively connected to said frame for raising and lowering said scoop when said shaft is rotated, a third pulley driving said shaft, differential drive mechanism adapted to be attached to the power takeoff mechanism of said tractor, and means operatively connecting said third pulley to said differential drive mechanism, said differential drive mechanism including a pair of drive shafts, a differential transmission operatively connected to each of said drive shafts, and brake means for individually preventing rotation of a selected one of said drive shafts to ensure rotation of the other thereof.

2. A manure loader for attachment to a tractor comprising a frame adapted to be pivotally attached to a tractor, a scoop on said frame, a substantially U-shaped supporting member adapted to be secured to a tractor including a pair of rearwardly extending legs interconnected by a central connecting portion, a vertical standard secured to and extending upwardly from said central connecting portion, a transverse beam carried by said standard, bearing blocks on said transverse beam, an operating shaft journalled in said bearing blocks, a pair of pulley wheels carried by said shaft operatively connected to said frame for raising and lowering said scoop when said shaft is rotated, a third pulley driving said shaft, differential drive mechanism adapted to be attached to the power takeoff mechanism of said tractor, and means operatively connecting said third pulley to said differential drive mechanism, said legs of said U-shaped member each terminating in opposed clamping jaws slidably clampingly engageable on said tractor, said differential drive mechanism including a pair of drive shafts, a fourth pulley on one of said drive shafts, and brake means for individually preventing rotation of a selected one of said drive shafts to ensure rotation of the other thereof, a pair of spaced frame members depending from said central connecting portion, an axle suspended from said frame members, and ground engaging wheels journalled on said axle.

References Cited in the file of this patent

UNITED STATES PATENTS

| Number | Name | Date |
|---|---|---|
| 1,780,806 | Williams | Nov. 4, 1930 |
| 1,792,851 | Marx | Feb. 17, 1931 |
| 2,330,802 | Andersen et al. | Oct. 5, 1943 |
| 2,382,346 | Streater | Aug. 14, 1945 |
| 2,410,567 | Christiansen | Nov. 5, 1946 |
| 2,443,174 | Andersen | June 15, 1948 |
| 2,443,175 | Andersen | June 15, 1948 |
| 2,468,602 | Lord | Apr. 26, 1949 |
| 2,519,974 | Mork | Aug. 22, 1950 |
| 2,593,500 | Thierry | Apr. 22, 1952 |